(12) United States Patent
Jeong (10) Patent No.: US 12,270,242 B2
(45) Date of Patent: Apr. 8, 2025

(54) SYSTEM AND METHOD FOR CONTROLLING VEHICLE

(71) Applicants: Hyundai Motor Company, Seoul (KR); Kia Corporation, Seoul (KR)

(72) Inventor: Tae Hun Jeong, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 368 days.

(21) Appl. No.: 17/892,061

(22) Filed: Aug. 20, 2022

(65) Prior Publication Data

US 2023/0184026 A1    Jun. 15, 2023

(30) Foreign Application Priority Data

Dec. 14, 2021  (KR) .................. 10-2021-0179078

(51) Int. Cl.
| | | |
|---|---|---|
| *E05F 15/77* | (2015.01) | |
| *E05F 15/76* | (2015.01) | |
| *G01S 13/88* | (2006.01) | |

(52) U.S. Cl.
CPC .............. *E05F 15/77* (2015.01); *E05F 15/76* (2015.01); *G01S 13/88* (2013.01)

(58) Field of Classification Search
CPC . E05C 17/003; E05C 17/006; E05F 2015/483
See application file for complete search history.

(56) References Cited

U.S. PATENT DOCUMENTS

| | | | | |
|---|---|---|---|---|
| 10,717,432 | B2 * | 7/2020 | Krekel | G06V 20/586 |
| 2020/0141176 | A1 * | 5/2020 | Ichinose | E05F 15/73 |
| 2020/0284876 | A1 * | 9/2020 | Hurd | G01S 7/415 |
| 2021/0264172 | A1 * | 8/2021 | Yoo | G08B 21/18 |

FOREIGN PATENT DOCUMENTS

KR    10-2021-0106690 A    8/2021

* cited by examiner

*Primary Examiner* — Kenneth J Malkowski
(74) *Attorney, Agent, or Firm* — Fox Rothschild LLP (57) ABSTRACT

A vehicle control system may include a portable terminal that transmits a door open command of a vehicle, a vehicle control device that updates a maximum value of a door opening amount of the vehicle, determines a current door opening amount based on surrounding environment information, and transmits the maximum value of the door opening amount and the current door opening amount, and a server that compares the current door opening amount with the maximum value of the door opening amount, and determines whether to perform a remote vehicle departure depending on the comparison result. The vehicle control system may improve driver comfort by controlling the door opening through a remote vehicle departure in a situation where the door cannot be opened remotely.

18 Claims, 11 Drawing Sheets

SYSTEM AND METHOD FOR CONTROLLING VEHICLE

CROSS-REFERENCE TO RELATED APPLICATION

This application claims under 35 U.S.C. § 119(a) the benefit of priority to Korean Patent Application No. 10-2021-0179078, filed in the Korean Intellectual Property Office on Dec. 14, 2021, the entire contents of which are incorporated herein by reference.

BACKGROUND

Technical Field

The present disclosure relates to a system and a method for controlling a vehicle.

Description of Background

Recently, a technology for remotely controlling the opening of a vehicle door is being developed. Specifically, when a remote open signal may be received, a vehicle calculates the maximum opening angle to prevent collision with surrounding obstacles based on the surrounding information detected by a sensor, and determines the risk of collision with the surrounding obstacles when the door may be opened at the maximum opening angle and then may control the opening angle of the door so as not to collide with the surrounding obstacles.

However, in the situation that the door cannot be opened due to the surrounding obstacles, a conventional art has a limitation in that it cannot provide convenience to drivers. Therefore, there is a need to develop a technology capable of improving the driver's convenience in addition to controlling the door opening angle.

SUMMARY

The present disclosure has been made to solve the above-mentioned problems occurring in the existing technologies while advantages achieved by the existing technologies may be maintained intact.

An embodiment of the present disclosure may be to provide a vehicle control system and a vehicle control method capable of controlling the door opening through a remote vehicle departure in a situation where the door cannot be opened remotely.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, a vehicle control system includes a portable terminal that is configured to transmit a door open command of a vehicle, a vehicle control device that is configured to update a maximum value of a door opening amount of the vehicle, determine a current door opening amount based on surrounding environment information, and transmit the maximum value of the door opening amount and the current door opening amount, and a server that is configured to compare the current door opening amount with the maximum value of the door opening amount, and determine whether to perform a remote vehicle departure depending on the comparison result.

According to an embodiment, the server may be configured to determine the remote vehicle departure, and may be configured to transmit data for controlling the remote vehicle departure and a message for confirming whether to perform the remote vehicle departure to the user and/or to the portable terminal when the current door opening amount may be less than the maximum value of the door opening amount.

According to an embodiment, the data for controlling the remote vehicle departure may include a door location where a door opening may be limited and a first distance from the vehicle to the portable terminal.

According to an embodiment, the portable terminal may be configured to output the door location in which the door opening may be limited and output a remote vehicle departure reservation interface when the data for controlling the remote vehicle departure may be received.

According to an embodiment, the portable terminal may transmit vehicle departure reservation information to the server when the vehicle departure reservation information may be input through the remote vehicle departure reservation interface.

According to an embodiment, the server may be configured to transmit a remote vehicle departure command to the vehicle control device, when it may be determined that the first distance may be less than a second distance included in the vehicle departure reservation information by receiving the vehicle departure reservation information from the portable terminal.

According to an embodiment, the vehicle control device may be configured to perform a vehicle departure control based on a movement trajectory stored at a speed less than or equal to a preset speed, when the remote vehicle departure command may be received from the server.

According to an embodiment, the portable terminal may be configured to output a remote vehicle departure cancellation interface when the current door opening amount may be changed by determining whether the current door opening amount may be changed, after the remote vehicle departure reservation interface may be output.

According to an embodiment, the server may be configured to transmit the door opening amount and a door openable message to the portable terminal when the current door opening amount may be greater than or equal to the maximum value of the door opening amount.

According to an embodiment, the portable terminal may be configured to output the door opening amount and the door openable message received from the server.

According to an embodiment of the present disclosure, a vehicle control method according to an embodiment of the present disclosure includes transmitting, by a portable terminal, a door open command of a vehicle to a server, determining, by a vehicle control device, a current door opening amount based on surrounding environment information, updating a maximum value of a door opening amount, and transmitting the current door opening amount and the maximum value of the door opening amount to the server, and comparing, by the server, the current door opening amount with the maximum value of the door opening amount, and determining whether to perform a remote vehicle departure depending on the comparison result.

According to an embodiment, the vehicle control method may further include determining the remote vehicle departure, and transmitting data for controlling the remote vehicle departure and a message for confirming whether to perform the remote vehicle departure to the user and/or to the portable terminal, when the current door opening amount may be less than the maximum value of the door opening amount.

According to an embodiment, the data for controlling the remote vehicle departure may include a door location where a door opening may be limited and a first distance from the vehicle to the portable terminal.

According to an embodiment, the vehicle control method may further include outputting, by the portable terminal, the door location in which the door opening may be limited and outputting a remote vehicle departure reservation interface when the portable terminal receives the data for controlling the remote vehicle departure.

According to an embodiment, the vehicle control method may further include transmitting, by the portable terminal, vehicle departure reservation information to the server when the vehicle departure reservation information may be input through the remote vehicle departure reservation interface.

According to an embodiment, the vehicle control method may further include transmitting, by the server, a remote vehicle departure command to the vehicle control device, when it may be determined that the first distance may be less than a second distance included in the vehicle departure reservation information by receiving the vehicle departure reservation information from the portable terminal.

According to an embodiment, the vehicle control method may further include performing, by the vehicle control device, a vehicle departure control based on a movement trajectory stored at a speed less than or equal to a preset speed, when the remote vehicle departure command may be received from the server.

According to an embodiment, the vehicle control method may further include outputting, by the portable terminal, a remote vehicle departure cancellation interface, when the current door opening amount may be changed by determining whether the current door opening amount may be changed, after the remote vehicle departure reservation interface may be output.

According to an embodiment, the vehicle control method may further include transmitting, by the server, the door opening amount and a door openable message to the portable terminal, when the current door opening amount may be greater than or equal to the maximum value of the door opening amount.

According to an embodiment, the portable terminal may output the door opening amount and the door openable message received from the server.

In a further embodiment, a vehicle is provided that comprises one or more vehicle control systems or use the vehicle control methods as disclosed herein.

BRIEF DESCRIPTION OF THE DRAWINGS

The above and other objects, features and advantages of the present disclosure will be more apparent from the following detailed description taken in conjunction with the accompanying drawings:

FIGS. 6 to 8B are diagrams illustrating a vehicle control method, according to an embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the drawings. In adding the reference numerals to the components of each drawing, it should be noted that the identical or equivalent component may be designated by the identical numeral even when they may be displayed on other drawings. Further, in describing the embodiment of the present disclosure, a detailed description of the related known configuration or function will be omitted when it may be determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
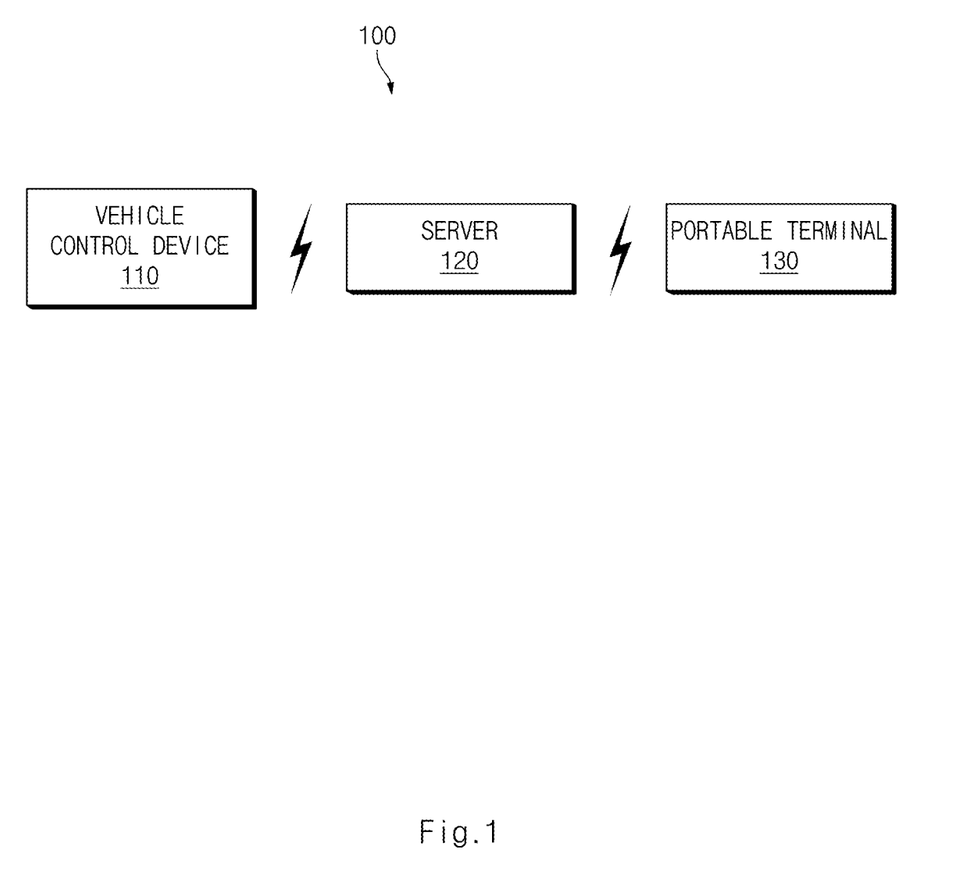
FIG. 1 is a diagram illustrating a configuration of a vehicle control system, according to an embodiment of the present disclosure.

FIG. 1 is a diagram illustrating a configuration of a vehicle control system, according to an embodiment of the present disclosure.

As illustrated in FIG. 1, a vehicle control system 100 may include a vehicle control device 110, a server 120, and a portable terminal 130.

The vehicle control device 110 may be configured to update a maximum value of a door opening amount of the vehicle, may obtain the current door opening amount based on surrounding environment information, and may transmit the maximum value of the door opening amount and the current door opening amount to the server 120. In addition, when a remote vehicle departure command may be received from the server 120, a vehicle departure operation may be performed. A more detailed description will be described with reference to FIG. 2.

The server 120 may receive the current door opening amount and the maximum value of the door opening amount from the vehicle control device 110, and may determine whether to perform a remote vehicle departure depending on a result of comparing the current door opening amount with the maximum value of the door opening amount. A more detailed description will be described with reference to FIG. 3.

The portable terminal 130 may be configured to transmit a door open command of a vehicle to the server 120. In addition, the portable terminal 130 may be configured to receive a determination result of whether the door may be opened from the server 120, and may output information corresponding to the determination result. A more detailed description will be described with reference to FIG. 4.

Figure 2:
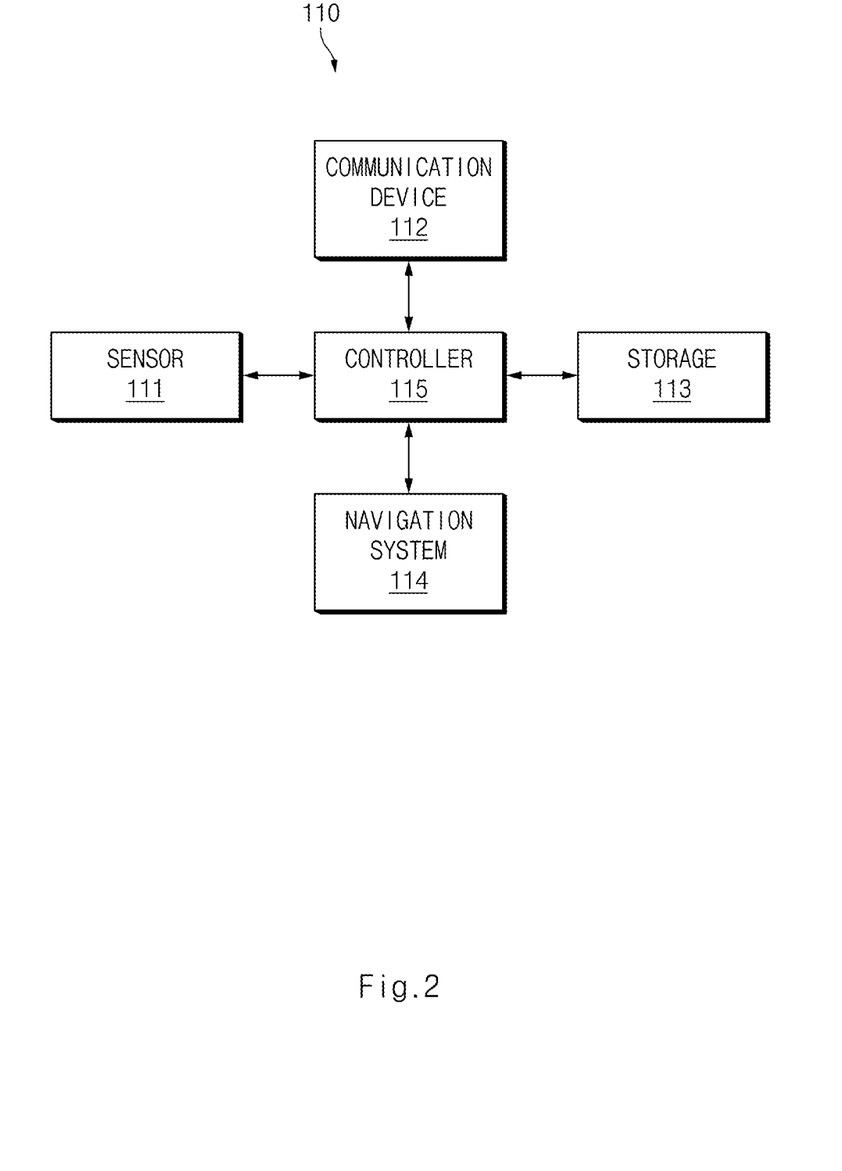
FIG. 2 is a diagram illustrating a configuration of a vehicle control device, according to an embodiment of the present disclosure.

FIG. 2 is a diagram illustrating a configuration of a vehicle control device, according to an embodiment of the present disclosure.

As illustrated in FIG. 2, the vehicle control device 110 may include a sensor 111, a communication device 112, storage 113, a navigation system 114, and a controller 115.

The sensor 111 may include a door sensor that detects opening and/or closing (opening/closing) of a door. The door sensor may be configured to obtain the door opening angle between opening and closing of a vehicle door in real time. The controller 115 may be configured to allow the maximum door opening angle among the obtained door opening angles to be stored in the storage 113 when the door may be closed. In addition, the sensor 111 may include a radar device that may be configured to obtain information about the surrounding environment of the vehicle, and according to an embodiment, the radar device may be configured to obtain location information of obstacles around the vehicle.

The communication device 112 may be configured to wirelessly communicate with the server 120. The communication device 112 may communicate with the server 120 in various wireless communication methods such as a Wi-Fi, a WiBro, a GSM (Global System for Mobile communication), a CDMA (Code Division Multiple Access), a WCDMA (Wideband Code Division Multiple Access), a UMTS (Universal Mobile Telecommunication System), a TDMA (Time Division Multiple Access), an LTE (Long Term Evolution), and the like.

The storage 113 may be configured to have stored thereon at least one or more algorithms for calculating or executing various commands for the operation of the vehicle control device 110 according to an embodiment of the present disclosure. The storage 113 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk. The storage may comprise non-transitory machine readable instructions stored thereon to perform the functions described herein.

The navigation system 114 may include a Global Positioning System (GPS) receiver to receive a current location of the vehicle, and may provide map image information of a specific area, vehicle speed information, and the like, based on the current location of the vehicle. The controller 115 may be configured to store the movement trajectory of the vehicle in the storage 113 when the vehicle may be at or below a preset speed based on information obtained by the navigation system 114. As used herein, "preset" may be understood to be any value stored, received, used, or otherwise within the system before the use of such preset value, such as in comparisons, calculators, etc.

The controller 115 may be implemented by various processing devices such as a microprocessor in which a semiconductor chip configured to calculate or execute various commands may be embedded, and the controller 115 may be configured to control the operation of the vehicle control device according to an embodiment of the present disclosure.

When the vehicle is traveling at a speed lower than a preset speed (e.g., 10 km/h), the controller 115 may be configured to store the movement trajectory of the vehicle. According to an embodiment, the controller 115 may allow the movement trajectory of the vehicle to be stored when the speed of the vehicle before the vehicle is stopped is equal to or less than a preset speed, and the controller 115 may allow the movement trajectory of the vehicle not to be stored when the speed of the vehicle is greater than or equal to the preset speed.

When the vehicle is stopped and the ignition is turned off, the controller 115 may be configured to detect a door open of the vehicle. When the door open of the vehicle may be detected, the controller 115 may initialize a maximum value of a preset door opening amount. That is, when the door open of the vehicle is detected, the controller 115 may be configured to set the maximum value of the preset door opening amount to '0'.

The controller 115 may determine whether the door is in an open state. When it may be determined that the door is in the open state, the controller 115 may continuously detect the door opening amount in the door open state and may update the maximum value of the door opening amount.

According to an embodiment, the controller 115 may be configured to detect the door opening amount. According to an embodiment, the door opening amount may mean a door opening angle, and the maximum value of the door opening amount may mean a maximum value of the door opening angle.

The controller 115 may be configured to determine whether the door opening amount exceeds the maximum value of the door opening amount. Since the maximum value of the door opening amount may be initially initialized, the amount of the first detected door opening may be the maximum value of the door opening amount. Thereafter, when the detected door opening amount exceeds the maximum value of the door opening amount by continuously detecting the door opening amount, the controller 115 may be configured to update the detected door opening amount as the maximum value of the door opening amount.

When the door is in the open state, the controller 115 may update the maximum value of the door opening amount, and when it may be determined that the door is not in the open state, the controller 115 may transmit the updated maximum value of the door opening amount to the server when the door may be in the open state.

When the updated maximum value of the door opening amount may be transmitted to the server 120, the controller 115 may be configured to determine whether a door open command may be received from the server 120. When it is determined that the door open command is received from the server 120, the controller 115 may determine a current door opening amount that may be opened currently based on the surrounding environment information of the vehicle.

The controller 115 may be configured to transmit the current door opening amount to the server 120, and may be configured to determine whether a remote vehicle departure command is received from the server 120. When it may be determined that the remote vehicle departure command is received from the server 120, the controller 115 may control a vehicle departure. According to an embodiment, the controller 115 may be configured to control the vehicle departure based on a movement trajectory pre-stored in the storage 113 when the vehicle leaves.

Figure 3:
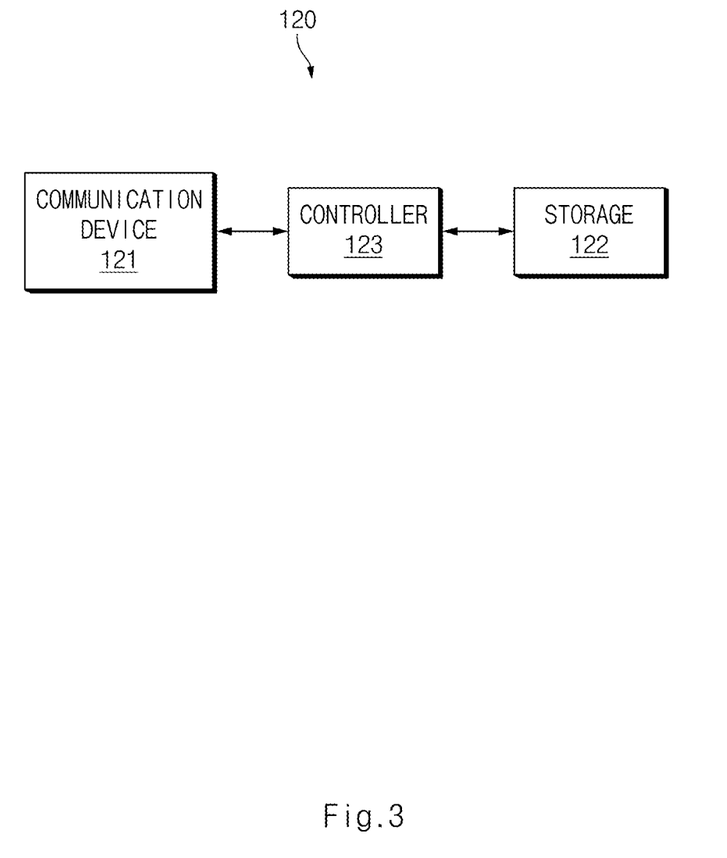
FIG. 3 is a diagram illustrating a configuration of a server, according to an embodiment of the present disclosure.

FIG. 3 is a diagram illustrating a configuration of a server, according to an embodiment of the present disclosure.

As illustrated in FIG. 3, the server 120 may include a communication device 121, storage 122, and a controller 123.

The communication device 121 may wirelessly communicate with the vehicle control device 110 and the portable terminal 130. The communication device 121 may communicate with the vehicle control device 110 and the portable terminal 130 in various wireless communication methods such as a Wi-Fi, a WiBro, a GSM (Global System for Mobile communication), a CDMA (Code Division Multiple Access), a WCDMA (Wideband Code Division Multiple Access), a UMTS (Universal Mobile Telecommunication System), a TDMA (Time Division Multiple Access), an LTE (Long Term Evolution), and the like.

The storage 122 may be configured to store at least one or more algorithms for calculating or executing various commands for the operation of the server 120 according to an embodiment of the present disclosure. The storage 122 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 123 may be implemented by various processing devices such as a microprocessor in which a semiconductor chip capable of calculating or executing various commands may be embedded, and the controller 123 may control the operation of the server 120 according to an embodiment of the present disclosure.

The controller 123 may be configured to transmit the maximum value of the door opening amount received from the vehicle control device 110 to the portable terminal 130, and when the door open command from the portable terminal 130 may be received, the controller 123 may transmit the door open command to the vehicle control device 110.

Also, the controller 123 may be configured to compare the maximum value of the door opening amount received from the vehicle control device 110 with the current door opening amount to determine a comparison result, and may determine whether to perform the remote vehicle departure depending on the comparison result. As described herein, the comparison result is simply used for ease of explanation that the controller may have performed a comparison between two values, which is then used in the control of the system. The comparison result need not actually be stored in memory, or otherwise be a separate data value that is produced by the controller after the comparison. According to an embodiment, when the current door opening amount may be less than the maximum value of the door opening amount, the controller 123 may be configured to determine that it is not easy to open the vehicle door, and may transmit data for the remote vehicle departure to the portable terminal 130. In this case, the data for the remote vehicle departure may include distance information between the vehicle and the portable terminal 130. In addition, the controller 123 may be configured to transmit a message for confirming whether to perform the remote vehicle departure to the user to the portable terminal 130 while transmitting the data for the remote vehicle departure. According to another embodiment of the present disclosure, the controller 123 may store in advance the door opening amount required when the user gets off from the vehicle, and even though the current door opening amount may be less than the door opening amount required when getting off the vehicle, since it may be determined that the door open of the vehicle at the current location may not be easy, the controller 123 may be configured to transmit a message for confirming whether to perform the remote vehicle departure to the portable terminal 130.

Meanwhile, when it is determined that the current door opening amount may not be less than the maximum value of the door opening amount, the controller 123 may be configured to transmit the current door opening amount and the door openable message to the portable terminal 130.

When vehicle departure reservation information may be received from the portable terminal 130, the controller 123 may be configured to compare the distance set in the vehicle departure reservation information with the distance between the current vehicle and the portable terminal, and may be configured to transmit the remote vehicle departure command to the vehicle control device 110 when the distance between the current vehicle and the portable terminal may be less than the distance set the vehicle departure reservation information.

Figure 4:
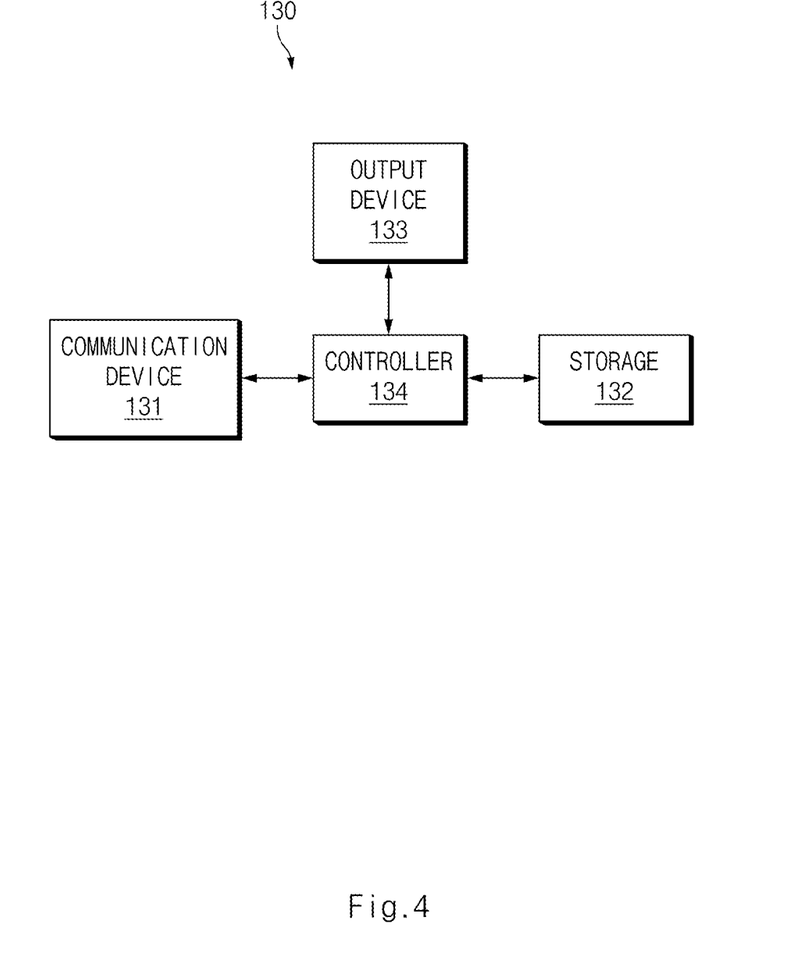
FIG. 4 is a diagram illustrating a configuration of a portable terminal, according to an embodiment of the present disclosure.

FIG. 4 is a diagram illustrating a configuration of a portable terminal, according to an embodiment of the present disclosure.

As illustrated in FIG. 4, the portable terminal 130 may include a communication device 131, storage 132, an output device 133, and a controller 134.

The communication device 131 may be configured to wirelessly communicate with the server 120. The communication device 131 may communicate with the server 120 in various wireless communication methods, such as a Wi-Fi, a WiBro, a GSM (Global System for Mobile communication), a CDMA (Code Division Multiple Access), a WCDMA (Wideband Code Division Multiple Access), a UMTS (Universal Mobile Telecommunication System), a TDMA (Time Division Multiple Access), an L (Long Term Evolution), and the like.

The storage 132 may be configured to store at least one algorithm for performing calculation or execution of various commands for the operation of the portable terminal 130, according to an embodiment of the present disclosure. The storage 132 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The output device 133 may be configured to output information received from the server 120 in at least one of a visual method, an auditory method, and a haptic method. To this end, the output device 133 may include a display device for outputting an image or video, the output device 133 may include a sound output device for outputting sound, and the sound output device may include a speaker. According to an embodiment, the output device 133 may be implemented integrally with the input device including a touch display.

The controller 134 may be implemented by various processing devices such as a microprocessor in which a semiconductor chip capable of calculating or executing various commands may be embedded, and the controller 134 may control the operation of the portable terminal 130 according to an embodiment of the present disclosure.

When a door open command may be generated based on the driver's input, the controller 134 may be configured to transmit the door open command to the server 120.

When the current door opening amount and the door openable message are received from the server 120, the controller 134 may be configured to output the current door opening amount and the door openable message to the output device 133.

When a message confirming whether to perform the remote vehicle departure is received, the controller 134 may be configured to output the message confirming whether to perform the remote vehicle departure. The controller 134 may be configured to output a remote vehicle departure reservation interface when the remote vehicle departure command may be input from the driver, and when a remote vehicle departure cancellation command is input from the driver, the controller 134 may output the remote vehicle departure cancellation interface.

In addition, the controller 134 may be configured to output a remote vehicle departure reservation interface based on the data for the remote vehicle departure received from the server 120, and may also display a door position in which door opening may be restricted. According to an embodiment, the controller 134 may output the vehicle departure reservation interface screen as illustrated in FIGS. 5A and 5B to the output device 133.

Figure 5A:
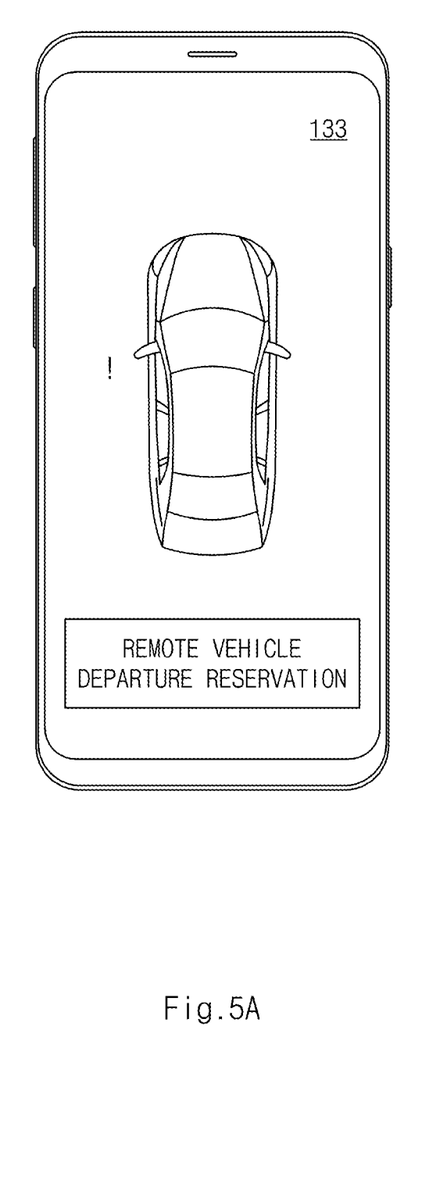
FIGS. 5A and 5B are diagrams illustrating an output screen of a portable terminal, according to an embodiment of the present disclosure.
Figure 5B:
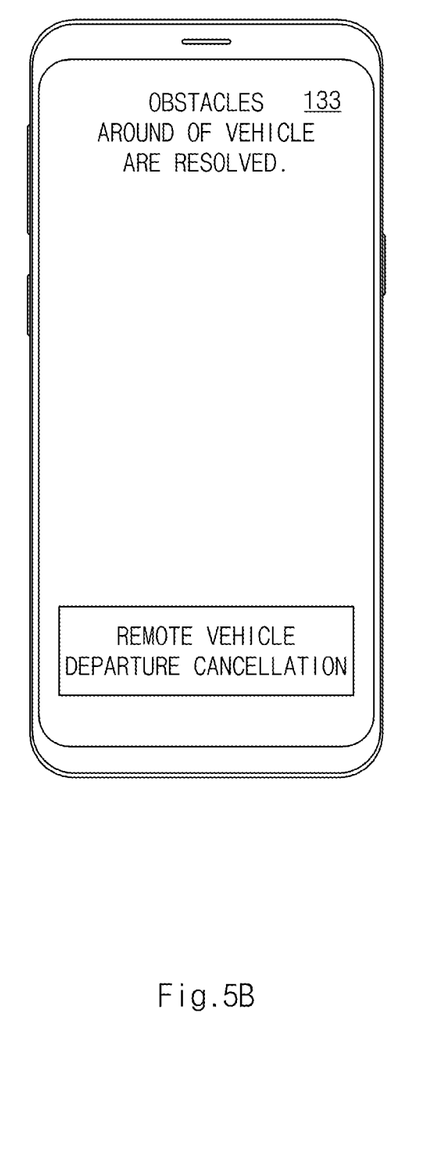

FIGS. 5A and 5B are diagrams illustrating an output screen of a portable terminal, according to an embodiment of the present disclosure.

As illustrated in FIG. 5A, when data for the remote vehicle departure is received from the server 120, the controller 134 may output the remote vehicle departure reservation interface that allows the user to input the remote vehicle departure reservation information. When the remote vehicle departure reservation information is input through the remote vehicle departure reservation interface, the controller 134 may be configured to transmit the remote vehicle departure reservation information to the server 120. In addition, the controller 134 may be configured to receive the current door opening amount information from the server 120 in real time even after the remote vehicle departure reservation interface is output, and may determine whether there is a change in the current door opening amount.

In detail, when the controller 134 determines that the current door opening amount is equal to or greater than the maximum value of the door opening amount due to the movement of the surrounding obstacles after the remote vehicle departure reservation interface is output, as illustrated in FIG. 5B, the controller 134 may be configured to output the remote vehicle departure cancellation interface that allows the user to select the remote vehicle departure cancellation together with a message indicating that obstacles around of the vehicle may be resolved.

When the vehicle departure reservation information is received from the driver, the controller 134 may be configured to transmit the vehicle departure reservation information to the server 120. In this case, the vehicle departure reservation information may include command information indicating that 'the remote vehicle departure may be executed at XX m before the driver arrives at the vehicle'.

FIGS. 6 to 8B are diagrams illustrating a vehicle control method, according to an embodiment of the present disclosure.

Figure 6:
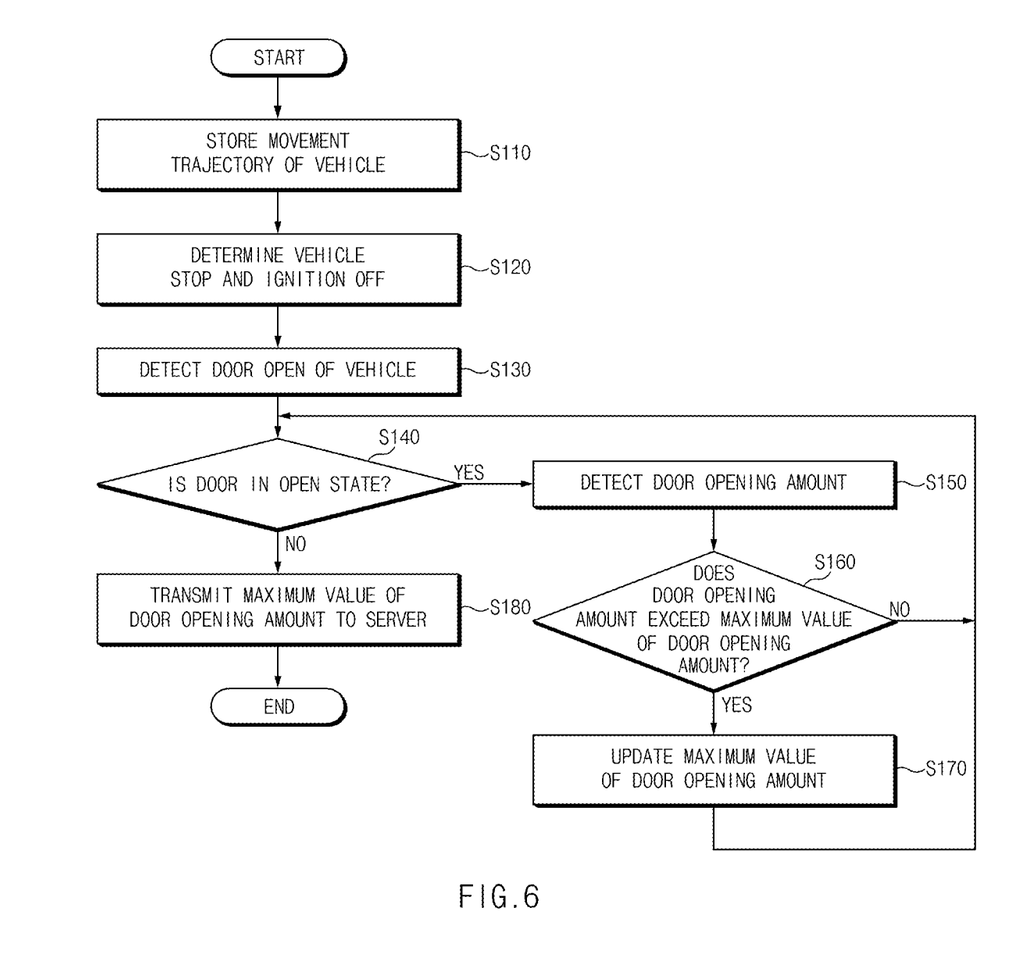

As illustrated in FIG. 6, when the vehicle may be traveling at a preset speed (e.g., 10 km/h) or less, the controller 115 may store the movement trajectory of the vehicle (S110). According to an embodiment, in S110, the controller 115 may allow the movement trajectory of the vehicle to be stored when the speed of the vehicle before the vehicle is stopped is equal to or less than a preset speed, and the controller 115 may allow the movement trajectory of the vehicle not to be stored when the speed of the vehicle is greater than or equal to the preset speed.

When it is determined that the vehicle is stopped and the ignition is turned off (S120), the controller 115 may detect a door open of the vehicle (S130). When the door open of the vehicle is detected, the controller 115 may initialize a maximum value of a preset door opening amount. In detail, when the door open of the vehicle is detected, the controller 115 may set the maximum value of a preset door opening amount to '0'.

After the door open is detected, the controller 115 may determine whether the door is in the open state (S140).

When it is determined that the door is in the open state (Y) in S140, the controller 115 may continuously detect the door opening amount in the door open state and may update the maximum value of the door opening amount.

According to an embodiment, the controller 115 may detect the door opening amount (S150), and may determine whether the door opening amount exceeds the maximum value of the door opening amount (S160). Since the maximum value of the door opening amount is initially initialized, the amount of the first detected door opening may be the maximum value of the door opening amount. Thereafter, when the detected door opening amount exceeds the maximum value of the door opening amount by continuously detecting the door opening amount, the controller 115 may update the detected door opening amount as the maximum value of the door opening amount (S170).

When the door is in the open state, the controller 115 may update the maximum value of the door opening amount, and when it is determined that the door is not in the open state, the controller 115 may transmit the updated maximum value of the door opening amount to the server when the door is in the open state (S180).

Figure 7:
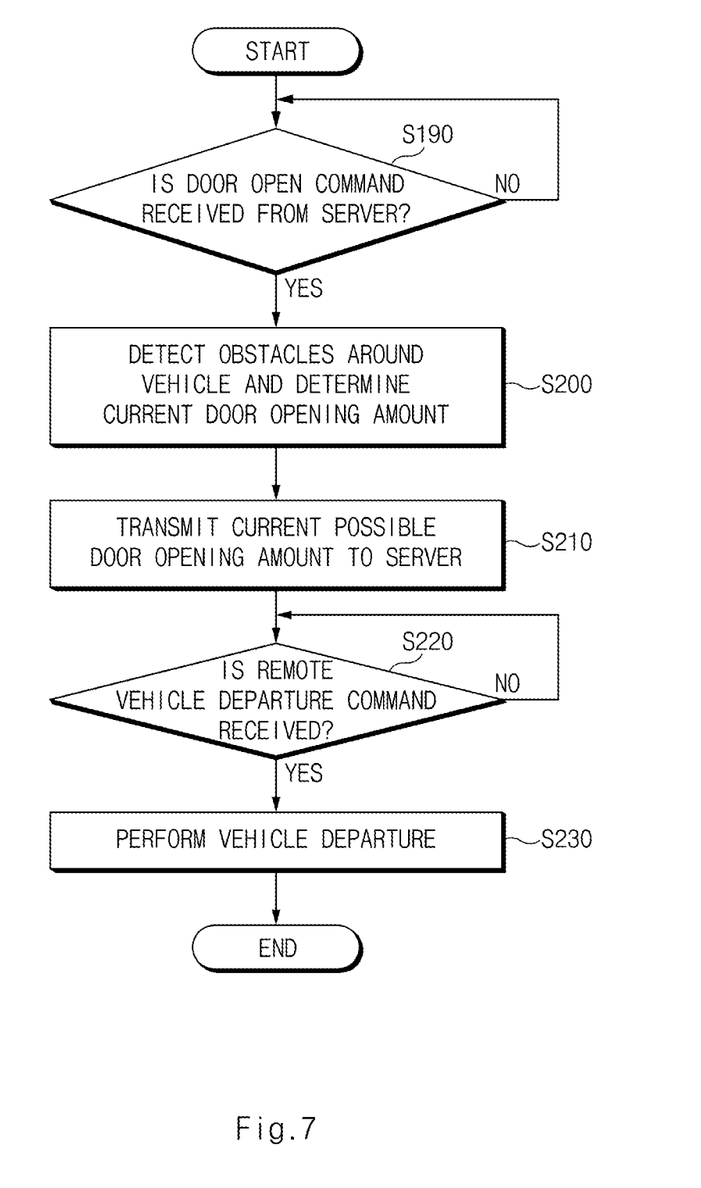

As illustrated in FIG. 7, after the maximum value of the door opening amount is transmitted to the server 120, the controller 115 may determine whether a door open command is received from the server 120 (S190).

When it is determined in S190 that the door open command is received from the server 120, the controller 115 may determine a current door opening amount of a door that can be opened currently based on the surrounding environment information of the vehicle (S200).

The controller 115 may transmit the current door opening amount to the server 120 again (S210), and may determine whether a remote vehicle departure command is received from the server 120 (S220).

When it is determined in S220 that the remote vehicle departure command is received from the server 120 (Y), the controller 115 may control the vehicle departure (S230). According to an embodiment, in S230, the controller 115 may control the vehicle departure based on the movement trajectory pre-stored in the storage 113 when the vehicle leaves.

Figure 8A:
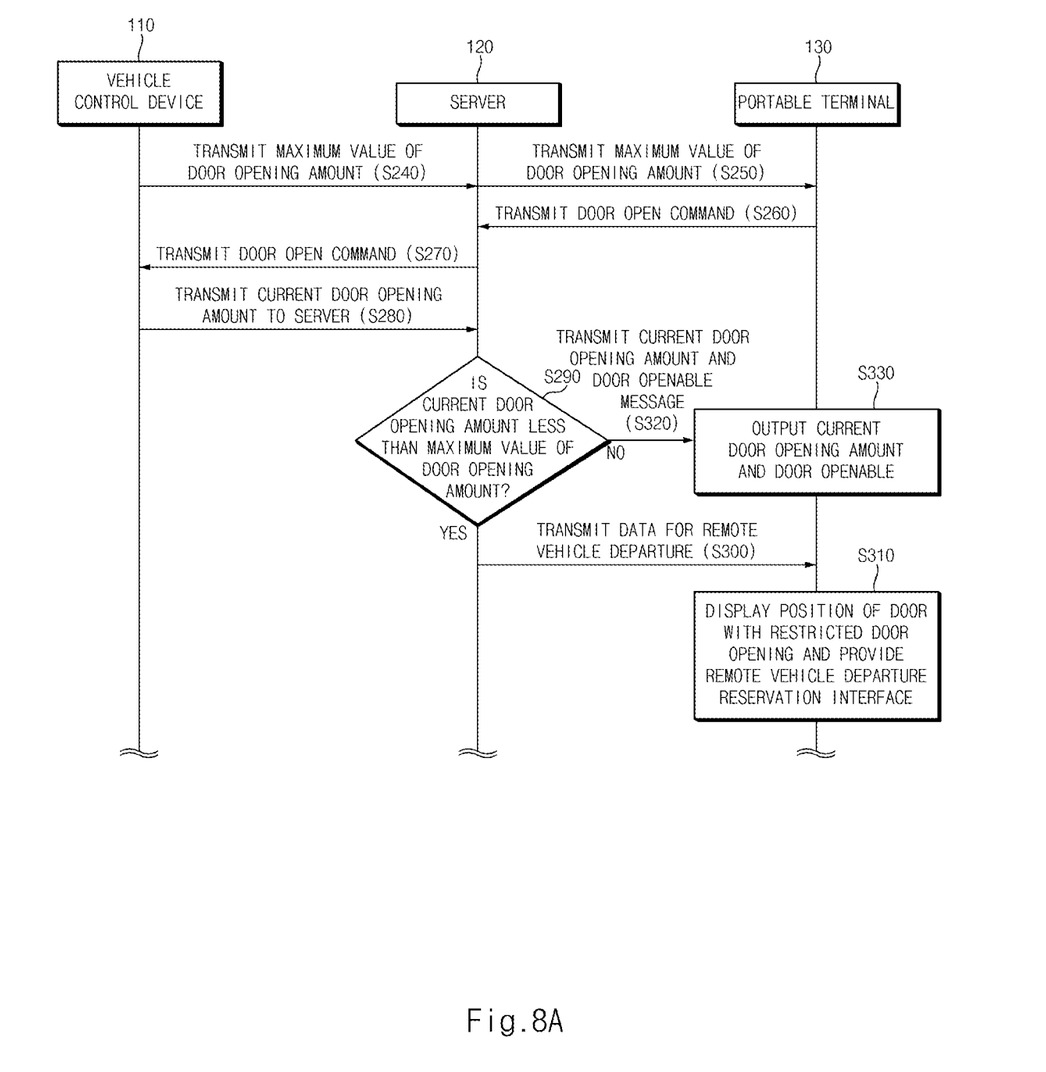
Figure 8B:
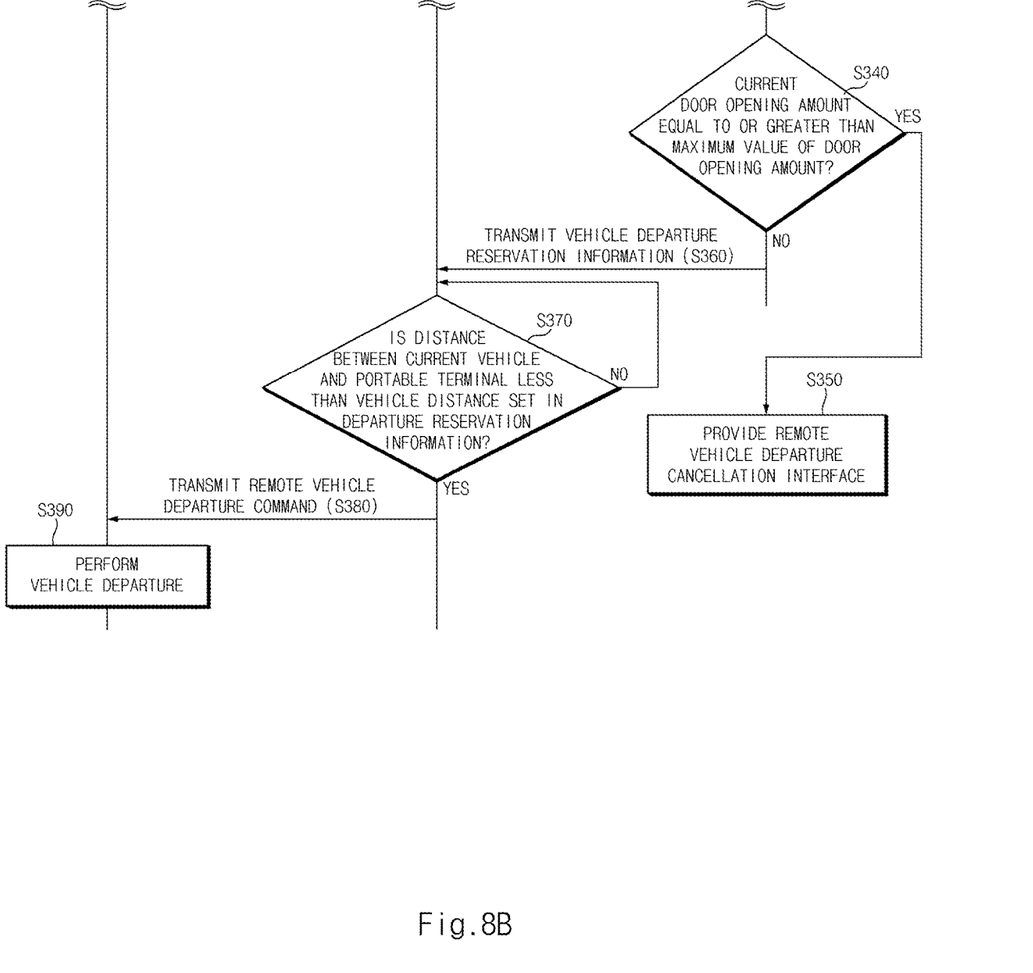

FIGS. 8A-8B describe processes after a maximum value of the door opening amount is transmitted to the server 120 in S180 of FIG. 6.

As illustrated in FIGS. 8A-8B, when the vehicle control device 110 transmits a maximum value of the door opening amount to the server 120 (S240), the server 120 may transmit the maximum value of the door opening amount to the portable terminal 130 (S250).

When the server 120 receives the door open command from the portable terminal 130 (S260), the server 120 may transmit the door open command to the vehicle control device 110 (S270).

The vehicle control device 110 may transmit the current door opening amount to the server 120 (S280), and the server 120 may compare the maximum value of the door opening amount received from the vehicle control device 110 in S240 with the current door opening amount received from the vehicle control device 110 in S280, and may determine whether to perform the remote vehicle departure depending on the comparison result. According to an embodiment, the server 120 may determine whether the current door opening amount is less than the maximum value of the door opening amount (S290).

In S290, when it is determined that the current door opening amount is less than the maximum value of the door opening amount (Y), the server 120 may determine that it is not easy to open the door of the vehicle, and may transmit data for the remote vehicle departure to the portable terminal 130 (S300). In this case, the data for the remote vehicle departure may include distance information between the vehicle and the portable terminal 130. In S300, the controller 123 may transmit a message for confirming whether to perform the remote vehicle departure to the user, to the portable terminal 130 while transmitting the data for the remote vehicle departure. According to another embodiment of the present disclosure, the controller 123 may store in advance the door opening amount required when the user gets off from the vehicle, and even though the current door opening amount is less than the door opening amount required when getting off the vehicle, since it may be determined that the door open of the vehicle at the current location is not easy, the controller 123 may transmit the message for confirming whether to perform the remote vehicle departure to the portable terminal 130.

Meanwhile, when it is determined in S290 that the current door opening amount is not less than the maximum value of the door opening amount (N), the controller 110 may transmit the current door opening amount and the door openable message to the portable terminal 130 (S320). The portable terminal 130 may output the current door opening amount and the door openable message that are received from the server 120 (S330).

After S330, when a message confirming whether to perform the remote vehicle departure is received from the server 120, the portable terminal 130 may output the message confirming whether to perform the remote vehicle departure.

The portable terminal 130 may output a remote vehicle departure reservation interface when the remote vehicle departure command is input from the driver (S310), and when a remote vehicle departure cancellation command is input from the driver, the portable terminal 130 may output the remote vehicle departure cancellation interface (S350).

In S310, the portable terminal 130 may display a position of a door with a restricted door opening or may output a remote vehicle departure reservation interface that allows the user to input the remote vehicle departure reservation information.

The portable terminal 130 may receive the current door opening amount information from the server 120 in real time even after the remote vehicle departure reservation interface is output, and may determine whether there is a change in the current door opening amount.

According to an embodiment, the portable terminal 130 may determine whether the current door opening amount is equal to or greater than the maximum value of the door opening amount (S340).

That is, when it is determined that the current door opening amount is equal to or greater than the maximum value of the door opening amount in S340 as the surrounding obstacles are moved after the remote vehicle departure reservation interface is output (Y), the portable terminal 130 may output a remote vehicle departure cancellation interface that allows the user to select the remote vehicle departure cancellation together with a message indicating that the obstacles around the vehicle is resolved (S350).

When it is determined in S340 that the current door opening amount is not equal to or greater than the maximum value of the door opening amount (N), the portable terminal 130 may transmit the vehicle departure reservation information input through the remote vehicle departure reservation interface to the server 120 (S360).

When the vehicle departure reservation information is received from the portable terminal 130, the server 120 may compare the distance set in the vehicle departure reservation information with the distance between the current vehicle and the portable terminal. According to an embodiment, the server 120 may determine whether the distance between the current vehicle and the portable terminal is less than the distance set in the vehicle departure reservation information (S370).

In S370, when the distance between the current vehicle and the portable terminal is less than the distance set in the vehicle departure reservation information (Y), the server 120 may transmit the remote vehicle departure command to the vehicle control device 110 (S380). In S370, when the distance between the current vehicle and the portable terminal is not less than the distance set in the vehicle departure reservation information (N), since the distance between the current vehicle and the portable terminal exceeds the distance set in the vehicle departure reservation information, the server 120 may determine the vehicle departure command transmission again without transmitting the vehicle departure command, until the distance between the current vehicle and the portable terminal is less than the distance set in the departure reservation information.

When the remote vehicle departure command is received, the vehicle control device 110 may control the vehicle departure based on a movement trajectory pre-stored in the storage 113 at the time of vehicle departure (S390).

Figure 9:
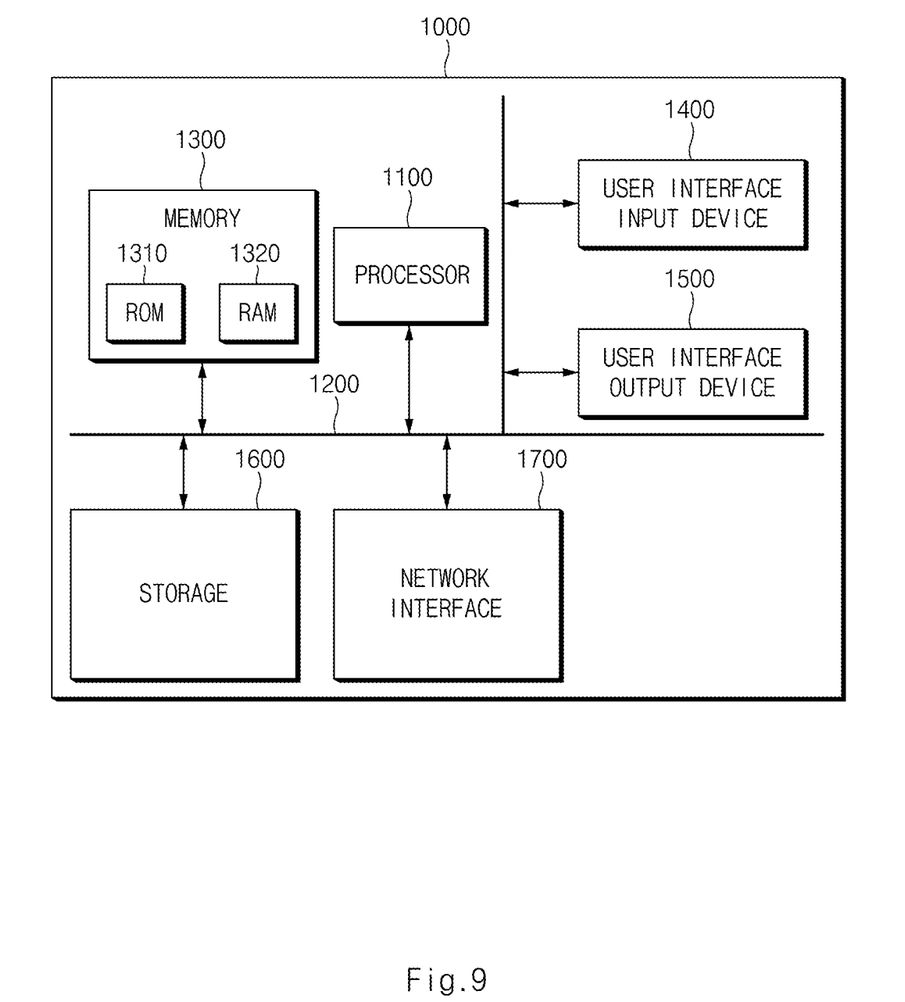
FIG. 9 is a diagram illustrating a configuration of a computing system for executing a method according to an embodiment of the present disclosure.

FIG. 9 is a diagram illustrating a configuration of a computing system for executing a method according to an embodiment of the present disclosure.

Referring to FIG. 9, a computing system 1000 may include at least one processor 1100, a memory 1300, a user interface input device 1400, a user interface output device 1500, storage 1600, and a network interface 1700, which may be connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which may be executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium as an example may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an embodiment of the present disclosure, a vehicle control system and method may improve driver comfort by controlling the door opening through a remote vehicle departure in a situation where the door cannot be opened remotely.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A vehicle control system comprising:
   a portable terminal configured to transmit a door open command of a vehicle;
   a vehicle control device configured to update a maximum angle at which the door is opened in response to a determination that the vehicle is stopped, to determine a current door opening angle based on surrounding environment information, and to transmit the maximum angle at which the door is opened in response to the determination that the vehicle is stopped and the current door opening angle; and
   a server configured to:
   control door opening at a remote location by directing the vehicle control device to perform a remote vehicle departure to move the vehicle to the remote location in response to determining that the current door opening angle is less than the maximum angle at which the door is opened in response to the determination that the vehicle is stopped; and
   enable opening of the door by transmitting the current door opening angle and a door openable message to the portable terminal in response to determining that the current door opening angle is greater than or equal to the maximum angle at which the door is opened in response to the determination that the vehicle is stopped,
   wherein the maximum angle at which the door is opened is the maximum angle to prevent collision with an obstacle.

2. The vehicle control system of claim 1, wherein the server is configured to:
   transmit data for controlling the remote vehicle departure and a message for confirming whether to perform the remote vehicle departure to the portable terminal, in response to controlling the door opening at the remote location.

3. The vehicle control system of claim 2, wherein the data for controlling the remote vehicle departure includes a door location where a door opening is not performed and a first distance from the vehicle to the portable terminal.

4. The vehicle control system of claim 3, wherein the portable terminal outputs the door location in which the door opening is not performed and outputs a remote vehicle departure reservation interface based on the data for controlling the remote vehicle departure received from the server.

5. The vehicle control system of claim 4, wherein the portable terminal transmits vehicle departure reservation information to the server based on the vehicle departure reservation information is-input through the remote vehicle departure reservation interface.

6. The vehicle control system of claim 5, wherein the server is configured to:
transmit a remote vehicle departure command to the vehicle control device, when it is determined that the first distance is less than a second distance included in the vehicle departure reservation information based on the vehicle departure reservation information received from the portable terminal.

7. The vehicle control system of claim 6, wherein the vehicle control device is configured to:
perform a vehicle departure control based on a movement trajectory stored in response to determination that the vehicle is traveling at a speed less than or equal to a preset speed, when the remote vehicle departure command is received from the server.

8. The vehicle control system of claim 4, wherein the portable terminal is configured to:
receive the current door opening angle from the server in real time in response to determination that the remote vehicle departure reservation interface is output;
determine that the current door opening angle is changed; and
output a remote vehicle departure cancellation interface in response to determination that the current door opening angle is changed.

9. The vehicle control system of claim 1, wherein the portable terminal is configured to:
output the door opening angle and the door openable message received from the server.

10. A vehicle control method comprising:
transmitting, by a portable terminal, a door open command of a vehicle to a server;
determining, by a vehicle control device, a current door opening angle based on surrounding environment information, updating a maximum angle at which the door is opened in response to a determination that the vehicle is stopped, and transmitting the current door opening angle and the maximum angle at which the door is opened in response to the determination that the vehicle is stopped to the server;
controlling, by the server, door opening at a remote location by directing the vehicle control device to perform a remote vehicle departure to move the vehicle to the remote location in response to determining that the current door opening angle is less than the maximum angle at which the door is opened in response to the determination that the vehicle is stopped; and
transmitting, by the server, the current door opening angle and a door openable message to the portable terminal to enable opening of the door in response to determining that the current door opening angle is greater than or equal to the maximum angle at which the door is opened in response to the determination that the vehicle is stopped,
wherein the maximum angle at which the door is opened is the maximum angle to prevent collision with an obstacle.

11. The vehicle control method of claim 10, further comprising:
transmitting data for controlling the remote vehicle departure and a message for confirming whether to perform the remote vehicle departure to the portable terminal, in response to controlling the door opening at the remote location.

12. The vehicle control method of claim 11, wherein the data for controlling the remote vehicle departure includes a door location where a door opening is not performed and a first distance from the vehicle to the portable terminal.

13. The vehicle control method of claim 12, further comprising:
outputting, by the portable terminal, the door location in which the door opening is not performed and outputting a remote vehicle departure reservation interface based on the data for controlling the remote vehicle departure received from the server.

14. The vehicle control method of claim 13, further comprising:
transmitting, by the portable terminal, vehicle departure reservation information to the server based on the vehicle departure reservation information is-input through the remote vehicle departure reservation interface.

15. The vehicle control method of claim 14, further comprising:
transmitting, by the server, a remote vehicle departure command to the vehicle control device, when it is determined that the first distance is less than a second distance included in the vehicle departure reservation information based on the vehicle departure reservation information from the portable terminal.

16. The vehicle control method of claim 15, further comprising:
performing, by the vehicle control device, a vehicle departure control based on a movement trajectory stored in response to determination that the vehicle is traveling at a speed less than or equal to a preset speed, when the remote vehicle departure command is received from the server.

17. The vehicle control method of claim 13, further comprising:
receiving, by the portable terminal, the current door opening angle from the server in real time in response to determination that the remote vehicle departure interface is output;
determining, by the portable terminal, that the current door opening angle is changed; and
outputting, by the portable terminal, a remote vehicle departure cancellation interface, in response to determination that the current door opening angle is changed.

18. The vehicle control method of claim 10, wherein the portable terminal outputs the door opening angle and the door openable message received from the server.

* * * * *